United States Patent [19]

Oh

[11] Patent Number: 5,327,927
[45] Date of Patent: Jul. 12, 1994

[54] TENTS FOR SCREENING THE SUNLIGHT

[75] Inventor: Sei-Yoon Oh, Seoul, Rep. of Korea

[73] Assignee: Korea Tarpaulin, Inc., Seoul, Rep. of Korea

[21] Appl. No.: 919,496

[22] Filed: Jun. 26, 1992

[30] Foreign Application Priority Data

Apr. 29, 1992 [KR] Rep. of Korea .................. 1992-7195

[51] Int. Cl.⁵ ............................................... A45F 3/00
[52] U.S. Cl. ........................ 135/117; 135/115; 135/97; 135/105; 403/205
[58] Field of Search .............. 135/117 OR, 116, 114, 135/99, 115, 97, 105, 106; 403/205, 403

[56] References Cited

U.S. PATENT DOCUMENTS

| | | | |
|---|---|---|---|
| 1,494,050 | 5/1924 | Wittmann | 135/117 |
| 2,942,609 | 6/1960 | Ferguson | 135/117 |
| 3,273,574 | 4/1966 | Huddle | 135/97 |
| 3,699,986 | 10/1972 | Kirkham | 135/117 |
| 3,874,396 | 4/1975 | Kirkham | 135/117 |
| 3,886,961 | 6/1975 | Geiger et al. | 135/97 |
| 4,000,749 | 1/1977 | Busco | 135/117 |
| 4,265,261 | 5/1981 | Barker | 135/117 |

FOREIGN PATENT DOCUMENTS 1338345  8/1963  France .................. 135/97

*Primary Examiner*—Carl D. Friedman
*Assistant Examiner*—Wynn E. Wood
*Attorney, Agent, or Firm*—Lowe, Price, LeBlanc & Becker

[57] ABSTRACT

A tent for screening the sunlight. The tent comprises a main sheet for screening the downwardly radiating sunlight, a plurality of front and rear tent poles for causing the main sheet to maintain its suspended shape, a plurality of ropes for being stretched to impart a tensile force to the main sheet, a pole support for supporting the tent poles as well as dispersing the vertical force generated in the poles and a detachable side sheet for intercepting the side radiating sunlight. The pole support comprises a base and a pair of pole support pipes which receive lower ends of the pipes. The base is embossed at its under surface with a raised figure to improve the frictional force between said pole support and the ground surface. The pole support pipes concentrate in the center of the base to have a V shape in cooperation with each other. The side sheet is provided with a plurality of connection hooks which are hooked in corresponding holes formed at predetermined positions of the poles supported by the pole support so that the side sheet occupies a part of triangular space provided between the poles.

3 Claims, 7 Drawing Sheets

TENTS FOR SCREENING THE SUNLIGHT

BACKGROUND OF THE INVENTION

1. Field of the Invention

The present invention relates in general to a tent, and more particularly to a sunscreen tent useful for screening the sunlight which comprises a V-shaped pole support for supporting the tent poles as well as dispersing the vertical force generated in the poles and a detachable side sheet for intercepting the side radiating sunlight.

2. Description of the Prior Art

As known to those skilled in the art, known tents are classified into various types, for example, A-shaped tents, domed tents and sunscreen tents, in accordance with their set up shapes and uses. Of the known tents, the sunscreen tent concerned with this invention is generally used out of doors for screening the sunlight and generally comprises a rectangular fabric ceiling sheet which is to be suspended by means of a plurality of tent poles and ropes, such that it is set up out of doors by erecting the tent poles corresponding to the center and the four corners of the ceiling sheet, and stretching each rope connected at an end to a corresponding corner and at the other end to a tent peg. At this time, the ropes connected at an end thereof to the corners of the tent are tightly fastened to the tent pegs simultaneously with being stretched, respectively, so that the tent maintains its tensioned shape.

However, such a sunscreen tent has a problem in setting up on a soft ground such as the lawn, the plains, or the sands while it has no problem in setting up on a hard ground such as an athletic field. In other words, in case of setting up the sunscreen tent on the soft ground, the tent poles by which the tent structure is tightly supported are gradually inserted into the ground as times goes by, so that each rope sags between the corner of the tent and the tent peg. In result, this causes the ceiling sheet to sag following suit. To solve the sagging of the ropes due to the insertion of the poles into the soft ground, the person in camping lays a flat, hard material such as a flat stone between the lowermost end of each pole and the ground surface or occasionally restretches the sagging ropes. The known sunscreen tents are, therefore, obliged to give the person in camping a burdensome caused by laying the flat stone or occasionally restretching the sagging ropes.

In addition, the main sheet of the known sunscreen tent generally consists of a rectangular-shaped fabric ceiling sheet so that the known sunscreen tent has a disadvantage in that it efficiently intercepts the downwardly radiating sunlight but can not intercept the side radiating sunlight.

SUMMARY OF THE INVENTION

It is, therefore, an object of the present invention to provide a screen tent in which the aforementioned problem can be overcome and which comprises at least two pole supports, each provided to support at least two poles together with preventing the poles from inserting into a soft ground, thus causing the tent to maintain its tensioned shape, and side sheets which are detachably tightly supported by the poles to intercept the side radiating sunlight as well as supporting the relative position of the tent poles.

In an aspect, the present invention provides a sunscreen tent comprising a tent for screening the sunlight comprising a main sheet for screening the downwardly radiating sunlight; a plurality of front and rear tent poles for causing said main sheet to maintain its suspended shape; a plurality of ropes for being stretched to impart a tensile force to the main sheet; a pole support for supporting said tent poles as well as dispersing the vertical force generated in the poles, said pole support comprising a base and a pair of pole support pipes which receive lower ends of said pipes; and a detachable side sheet for intercepting the side radiating sunlight, said side sheet being provided with a plurality of connection hooks which are hooked in corresponding holes formed at predetermined positions of the poles supported by the pole support so that the side sheet occupies a part of triangular space provided between the poles.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
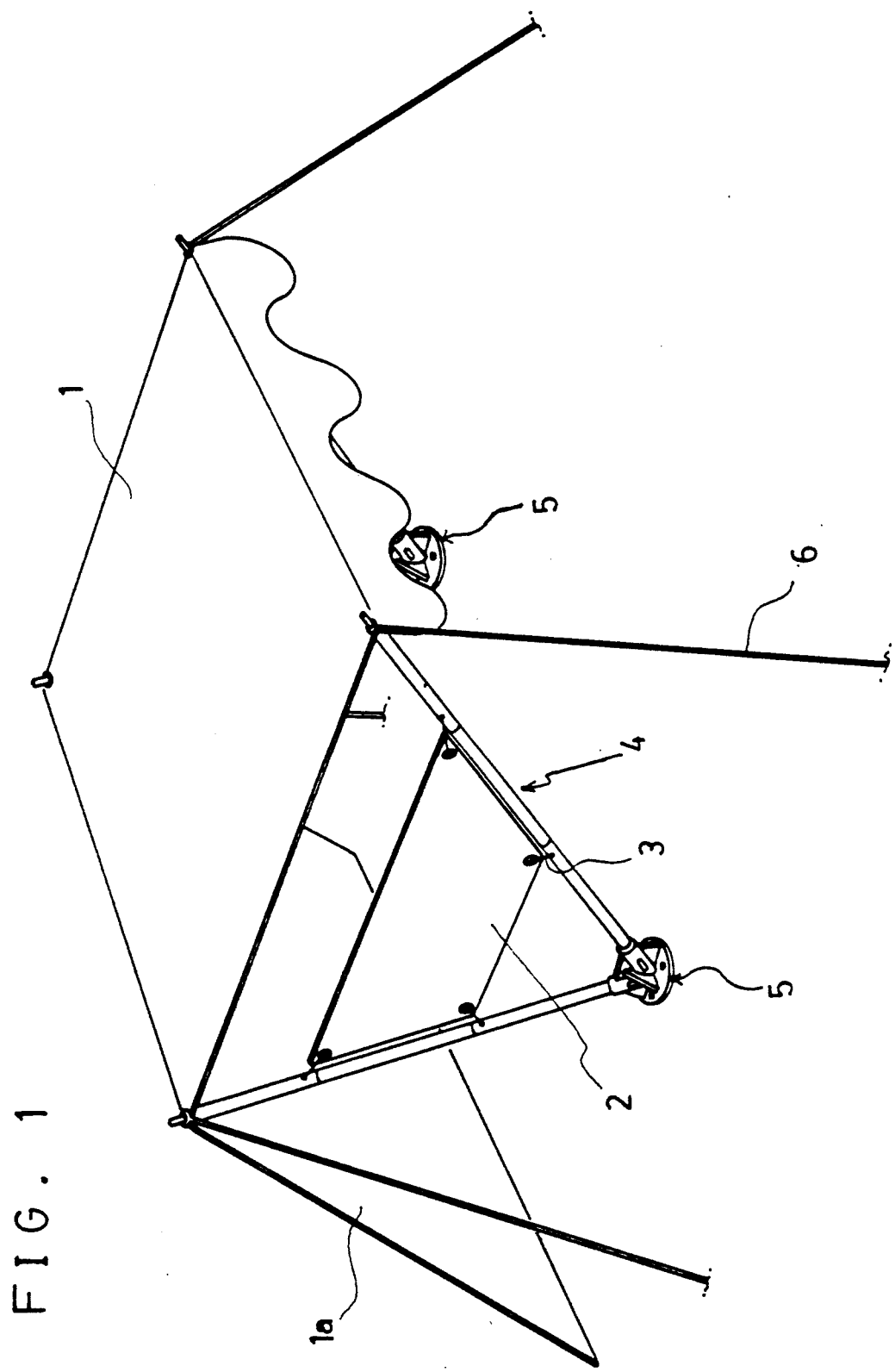
FIG. 1 is perspective view showing an embodiment of a set up state of a sunscreen tent of this invention.
Figure 2:
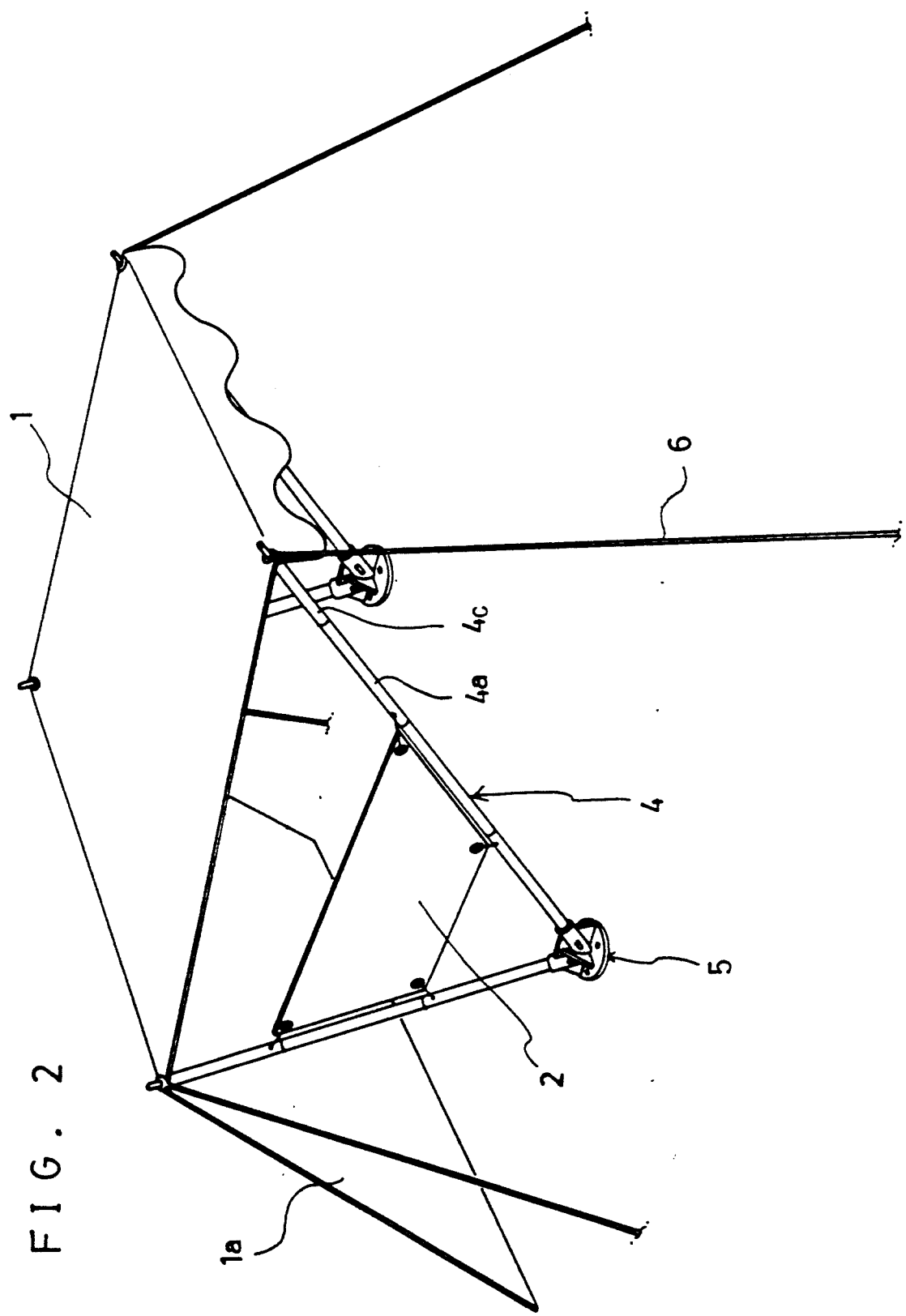
FIG. 2 is a view corresponding to FIG. 1, but showing another embodiment of a set up state of the sunscreen tent of this invention.
Figure 3:
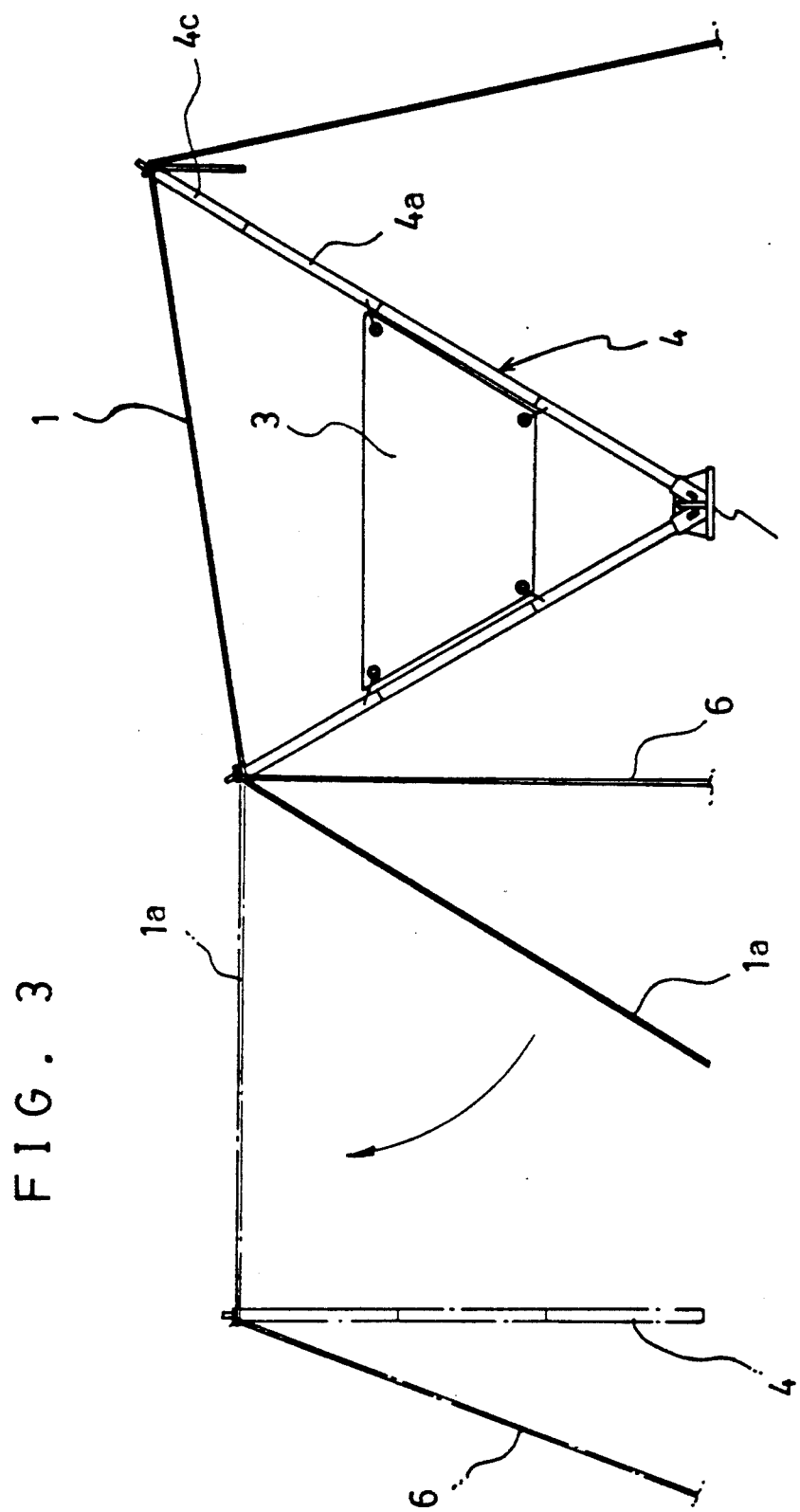
FIG. 3 is a side view of FIG. 2.

Referring now to FIGS. 1 to 3 showing embodiments of a set up state of a sunscreen tent according to this invention, the tent comprises a rectangular ceiling sheet 1, preferably made of fabrics, for intercepting the downwardly radiating sunlight, a plurality of tent poles 4 which are erected for causing the ceiling sheet 1 to maintain its stretched shape, a pair of pole supports 5 for supporting two poles 4 at the same time, and a plurality of ropes 6 each connected at an end to a corresponding corner of the ceiling sheet 1 and tightly fastened at the other end to a tent peg (not shown) to impart the tensile force to the tent structure.

Figure 8:
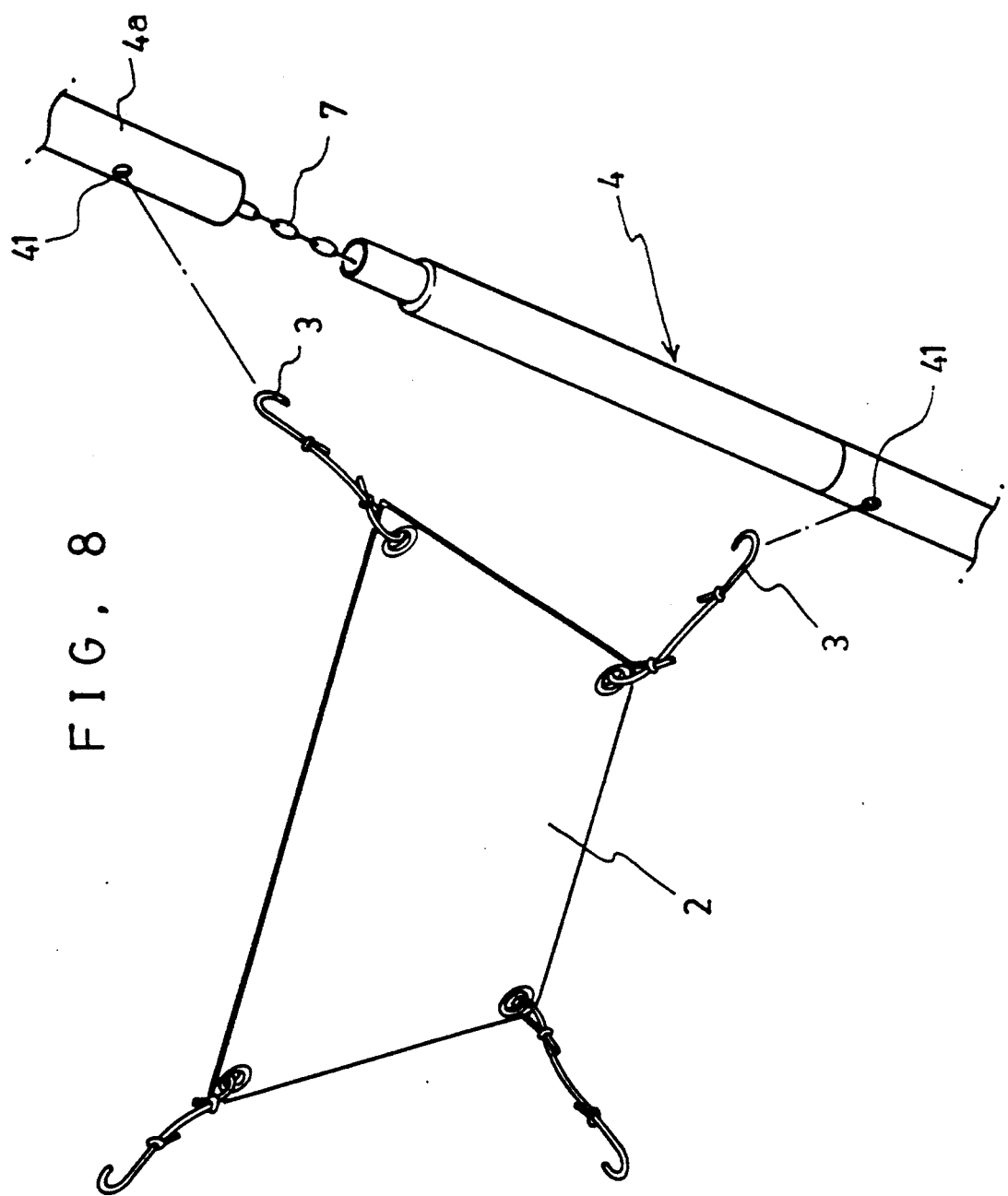
FIG. 8 is a perspective view showing how a side sheet of the tent of this invention is incorporated in the tent structure.
Figure 9:
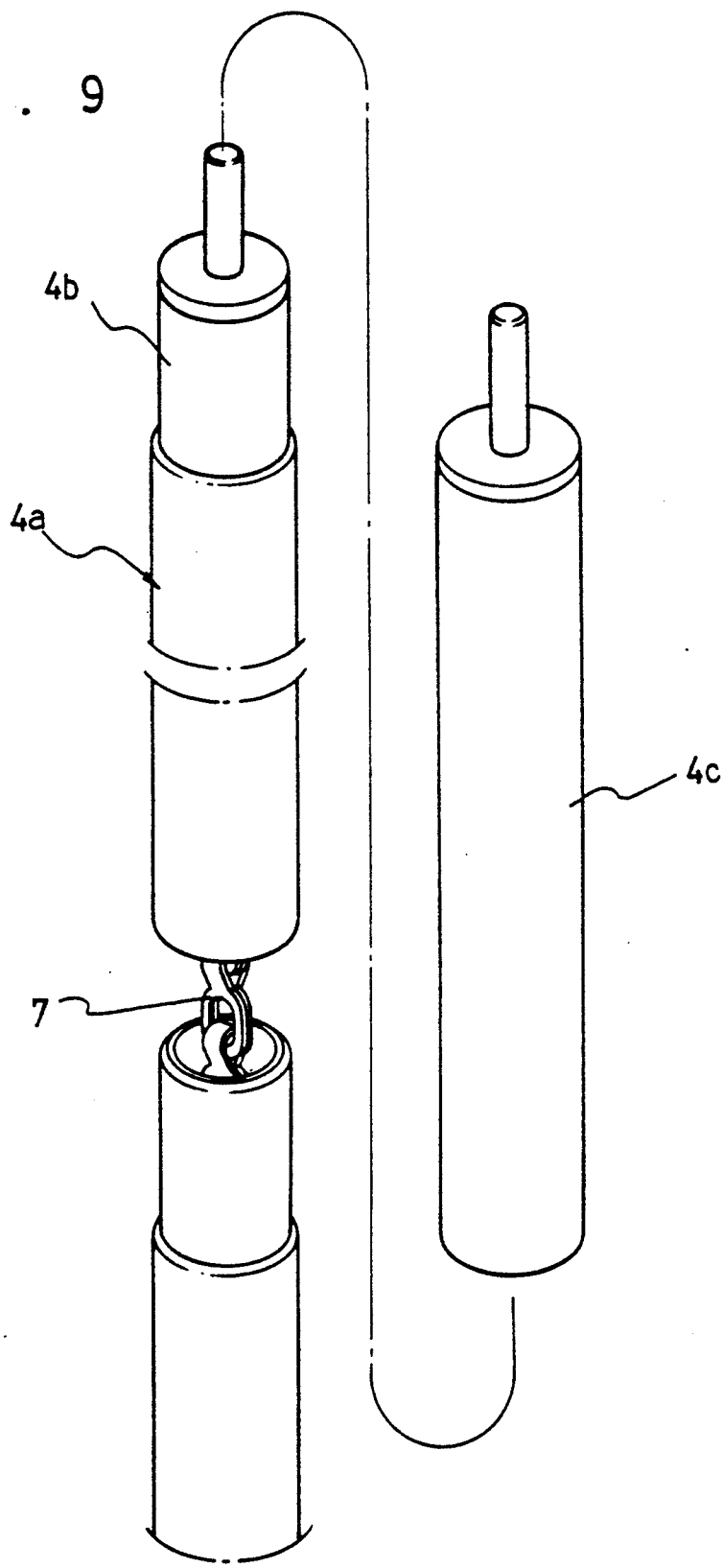
FIG. 9 is an exploded perspective view of the tent pole of this invention.

Additionally, a rectangular subsidiary sheet 1a, preferably made of the same fabrics as the ceiling sheet 1, integrally extends from the rear periphery of the ceiling sheet 1 and a pair of trapezoidal side sheets 2 are detachably incorporated in the tent structure by being engaged with the poles 4. Each side sheet 2 occupies a part of a triangular space provided between the pair of poles 4 supported by a pole support 5, thus efficiently intercepting the side radiating sunlight. As shown in FIG. 8 which shows how the side sheet 2 is engaged with the tent poles 4, the side sheet 2 is provided with connection hooks 3 at its four corners. In incorporating the side sheet 2 in the tent structure, each connection hook 3 of the sheet 2 is hooked in a corresponding hole 41 formed at a predetermined position of the pole 4 so that the side sheet 2 is tightly stretched and causes the poles 4 to maintain their relative positions.

Figure 4:
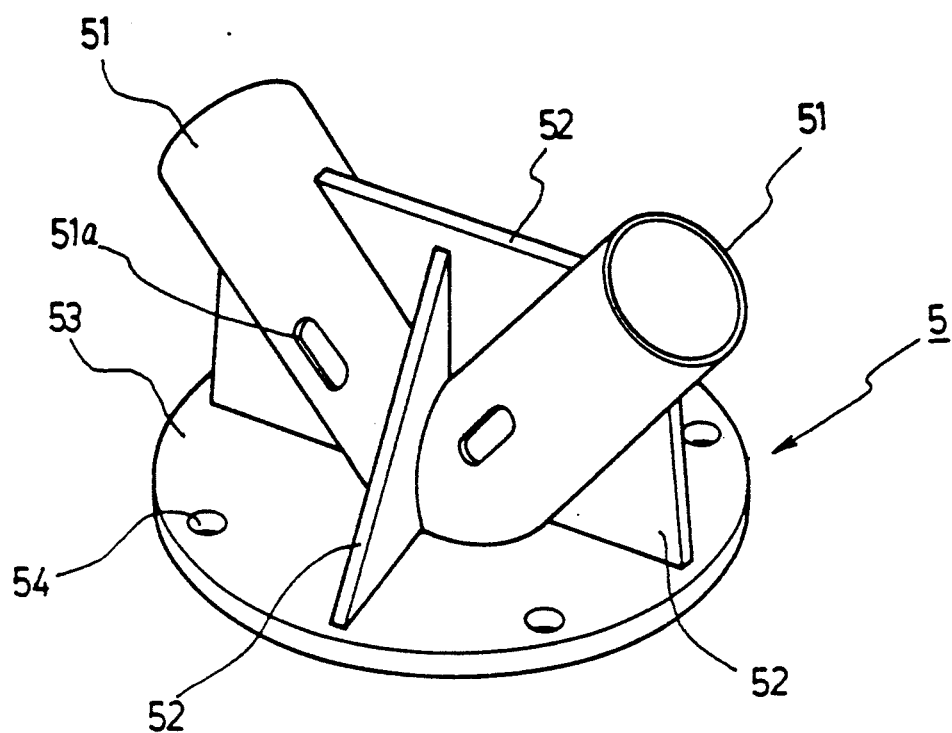
FIG. 4 is a perspective view of an embodiment of a pole support of this invention.
Figure 5:
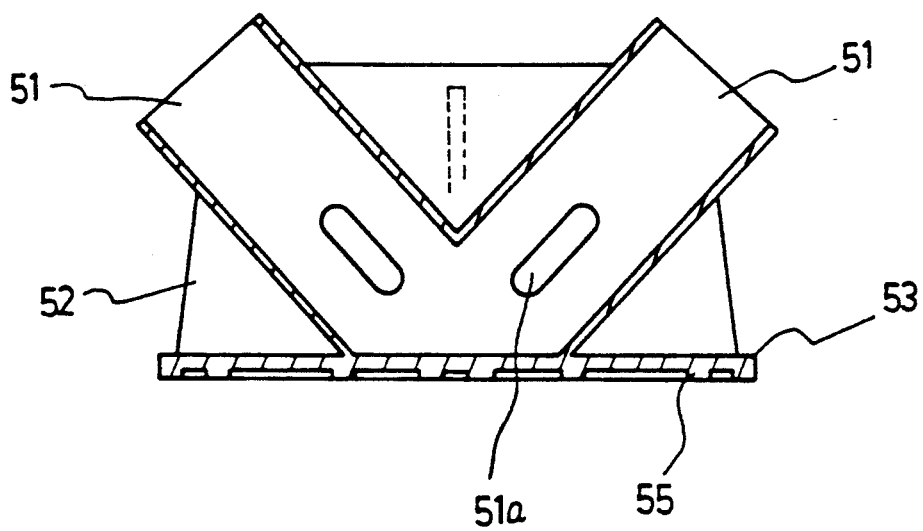
FIG. 5 is an elevational sectioned view of the pole support of FIG. 4.
Figure 6:
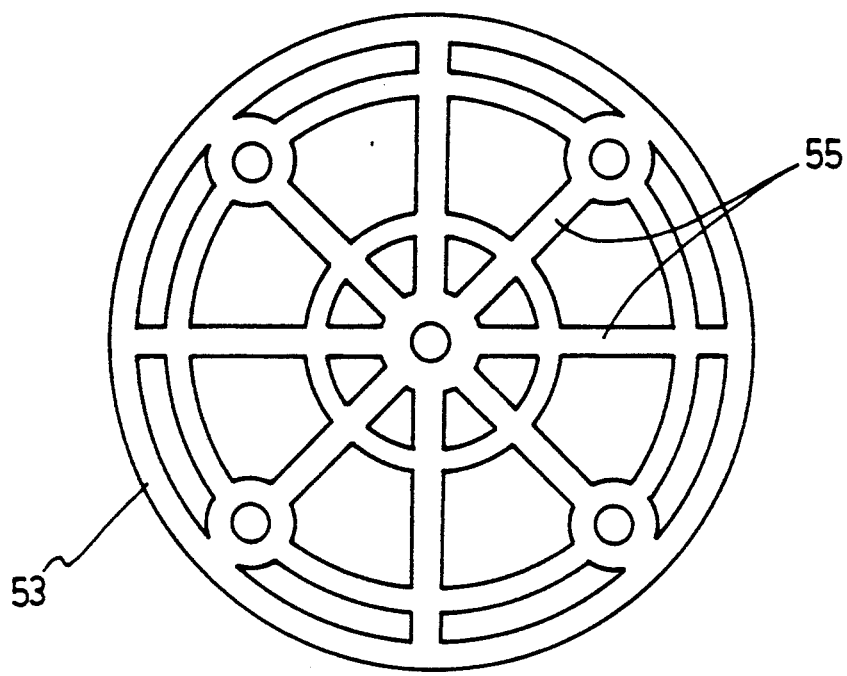
FIG. 6 is a bottom view of the pole support of FIG. 4.

Turning to FIGS. 4 to 6, the pole support 5, preferably produced by forming with a metal or a synthetic resin, comprises a circular base 53 including a plurality of holes 54 through which the tent pegs are driven into the ground to stick the pole support to the ground. The base 53 is integrally provided with a pair of pole support pipes 51 in which the lower ends of the tent poles 4 are received, respectively, and which concentrate in the center of the base 53 to have a V shape in cooperation with each other. The V-shaped pipes 51 are reinforced by a cross-shaped stiffening member 52 which is integrally formed with the base 53 and the pipes 51.

The base 53 of the pole support 5 is preferably embossed at the under surface thereof with a raised FIG. 55, for example, concentrically circular and radial ribs as depicted in FIG. 6, to improve the frictional force between the pole support 5 and the ground surface.

Figure 7:
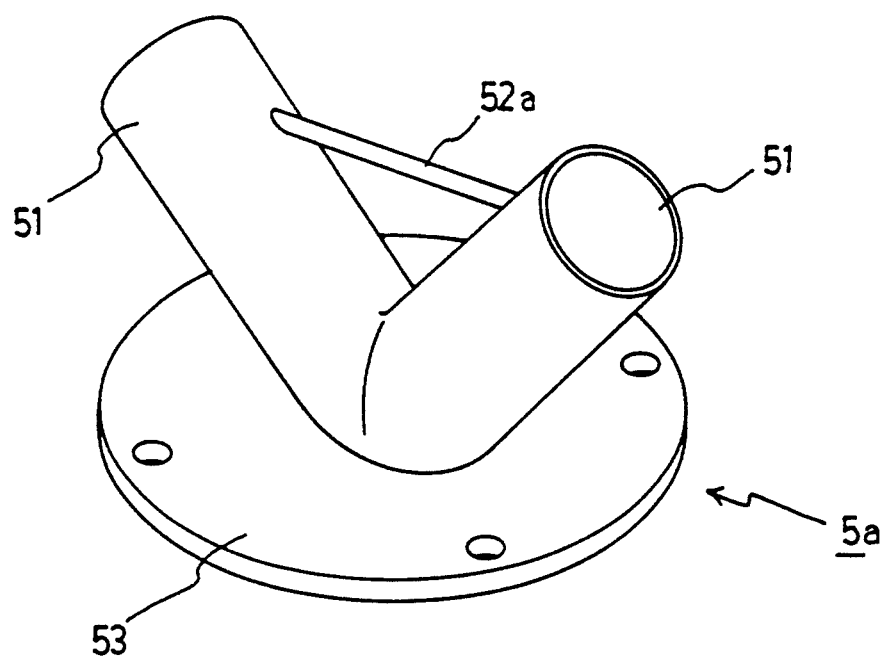
FIG. 7 is a perspective view of another embodiment of the pole support of this invention.

On the other hand as shown in FIG. 7 which show another embodiment of a pole support, the pole support 5a may be constructed to have a simple connection pipe 52a instead of the aforementioned cross-shaped stiffening member 52 for integrally connecting the pipes 51 to each other.

Each tent pole 4 comprises a plurality of short, hollow pipes in which an elastic chain 7 is received to connect the short pipes to each other so that the short pipes generally separated from each other are linearly connected to each other to provide the pole 4 having a predetermined length. Additionally the uppermost short pipe 4a of the tent pole 4 is provided with a connection part 4b for engaging with an additional elongation pipe 4c.

In the drawings, the reference number 51 a denotes a hole through which a foreign substance, such as soil, blocking up the pole support pipe 51 can be discharged.

The operational effect of the sunscreen tent having the above-mentioned structure will be described as follows.

To set up the present tent on the ground, the short pipes of each tent pole 4 are linearly connected to each other to provide the pole 4 having the predetermined length, and each the tent pole 4 is inserted at the lower end thereof in the corresponding pole support pipe 51 of the pole support 5 which is stuck to the ground by means of the tent pegs, then the uppermost end of the pole 4 is received in a hole provided at a corresponding corner of the ceiling sheet 1. Thereafter, the rope 6 connected to a corresponding corner of the sheet 1 is stretched and tightly fastened to a tent peg inserted into the ground, thereby imparting the tensile force to the tent structure. The side sheets 2 are incorporated in the tent structure by hooking the connection hooks 3 thereof in the holes 41 of the poles 4, thereby accomplishing the set up of the present sunscreen tent.

On the other hand, all of the tent poles 4 may have the same length with each other so that the ceiling sheet 1 is parallel to the ground surface as depicted in FIG. 1, while they may have different lengths such that the length of the front poles 4 is relatively longer than the rear poles 4 by connecting the additional elongation pipes 4c to the connection parts 4b of their uppermost short pipes 4a, respectively, as depicted in FIGS. 2 and 3. In case of setting up the tent using the poles 4 having the different lengths, the ceiling sheet 1 is gently inclined with respect to the ground surface so that the inclination angle of the ceiling sheet 1 with respect to the ground surface is easily controlled to correspond to a radiation angle of the sunlight or to make rain water not to collect on the ceiling sheet 1 but to run down the inclined ceiling sheet 1.

As shown in FIGS. 1 to 3, the subsidiary sheet 1a integrally extending from the rear periphery of the ceiling sheet 1 may hang down to screen the wind blowing or the sunlight radiating from the back side as shown at the solid lines of FIGS. 1 and 2 or be suspended by supporting its back side by means of additional poles 4 to screen the downwardly radiating sunlight in cooperation with the ceiling sheet 1 as shown at the dotted line of FIG. 3.

As described above, the present invention provides a sunscreen tent including the V-shaped pole support for supporting two tent poles as well as dispersing the vertical force generated in the poles supporting the tent structure, thereby causing the tent structure to maintain a desired stretched shape as a result of preventing the poles from inserting into the ground, especially the soft ground. In addition, the pole support is integrally provided with a pair of pole support pipes for receiving two poles at the same time so that it is easily carried out to set up the tent on the ground. The sunscreen tent of this invention is provided with the side sheet which is simply incorporated in the tent structure by being engaged with the poles to occupy a part of triangular space provided between the two poles supported by a pole support, thereby efficiently screening the side radiating sunlight together with causing the tent poles to maintain their relative positions.

On the other hand, the subsidiary sheet integrally extending from the rear periphery of the ceiling sheet may hang down to screen the wind blowing or the sunlight radiating from the back side or may be suspended by supporting its back side by means of additional poles to screen the downwardly radiating sunlight in cooperation with the ceiling sheet. The tent poles may have the same length with each other so that the ceiling sheet is parallel to the ground surface or they may have different lengths such that the length of the front poles is relatively longer than the rear poles, thereby controlling the inclination angle of the ceiling sheet to correspond to the sunlight radiation angle and to make rain water to run down the inclined ceiling sheet.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A tent for screening the sunlight comprising:
   a main sheet for screening the downwardly radiating sunlight;
   a plurality of front and rear tent poles for causing said main sheet to maintain its suspended shape, each said tent pole comprising a plurality of pipes which are linearly connected to each other;
   a plurality of ropes for being stretched to impart a tensile force to the main sheet;
   a pole support for supporting said tent poles as well as dispersing the vertical force generated in the poles, said pole support comprising integrally a base, a pair of pole support pipes joined in V-shape to receive lower ends of said poles;

a cross-shaped stiffening arrangement formed integral to said base and said pole support pipes to reinforce same; and a detachable side sheet having a plurality of connection hooks which are hooked in corresponding holes formed at predetermined positions of the poles supported by the pole support to selectively intercept the sunlight through the space between the poles.

2. A tent according to claim 1, wherein said base is embossed at its undersurface with a raised figure to improve the frictional force between said pole support and the ground surface.

3. A tent according to claim 1, wherein each said front tent pole is provided at the uppermost end thereof with a connection part for engaging with an additional elongation pipe to provide a controlled inclination to said main sheet.

* * * * *